Feb. 6, 1923.

G. B. GATES

PACKING

Original Filed Apr. 30, 1913

1,444,457

Witnesses:
B. M. Newell
C. B. Creighton

Inventor:
George B. Gates
by S. W. Bates
Atty.

Patented Feb. 6, 1923.

1,444,457

UNITED STATES PATENT OFFICE.

GEORGE B. GATES, OF BOSTON, MASSACHUSETTS.

PACKING.

Application filed April 30, 1913, Serial No. 764,539. Renewed November 9, 1920. Serial No. 422,967.

*To all whom it may concern:*

Be it known that GEORGE B. GATES, a citizen of the United States, residing at Boston, in the county of Suffolk and State of Massachusetts, has invented certain new and useful Improvements in Packings, of which the following is a specification.

My invention relates to a stuffing box for plastic packing, such as is used for packing piston and valve rods, pump plungers and similar mechanism.

One of the difficulties of making an efficient packing of the plastic type when used in the ordinary way in a stuffing box having parallel sides, is that when pressure is exerted by the follower against the rings to force them into contact with the rod that the rings are compressed in the wrong direction (parallel with the rods). This tends to harden the packing material by direct pressure against the end of the stuffing box and results in a considerable damage to its plastic properties. This action is still further emphasized if the packing material be of a metallic nature which is the most efficient in respect of durability and freedom from friction.

Usually the plastic packing material, when metallic, is composed of particles of a suitable alloy or composition to possess the desirable characteristics and may or may not be mixed with graphite, greases, or similar lubricants.

When in use, the metal particles under pressure of the follower, are forced into contact with the rod and the attrition of the rod soon rubs the particles immediately surrounding it into a practically continuous metallic skin which acts as a close fitting sleeve in which the rod runs fluid tight. When from wear it requires adjustment the application of more follower pressure forces the packing against the rod and permits a renewal of the fit.

A few repetitions of this process with the addition of new rings at the outer end to compensate for wear and compressions have heretofore resulted in the metal particles at the inner end becoming hardened and more or less amalgamated together and largely losing their ability to flow and to move one upon the other upon which the plastic characteristics of the mass largely depend. The fact that the greatest wear and the consequent necessity for a renewal of the fit occurs at the inner or cylinder end, and that usually the destruction of the newer outer rings is involved in their removal in order to replace the defective inner rings, has heretofore made packing of this type too expensive for general use.

The object of the invention is: first, to construct a receptacle that will have a progressive wedging action upon a substantial portion of the packing material at the inner end to force it against the rod when pressure is applied by the follower; and second, to produce an improved structure of a stuffing box in which a plastic packing material may be passed through the stuffing box and entirely utilized or eliminated when it becomes useless by disintegration.

I carry out the above objects by means of the instrumentalities hereinafter described and claimed.

My invention may best be understood by means of the accompanying drawing, in which is shown a stuffing box constructed in accordance with my invention and with a strand of metallic packing adapted to be used in the same.

Figure 1:
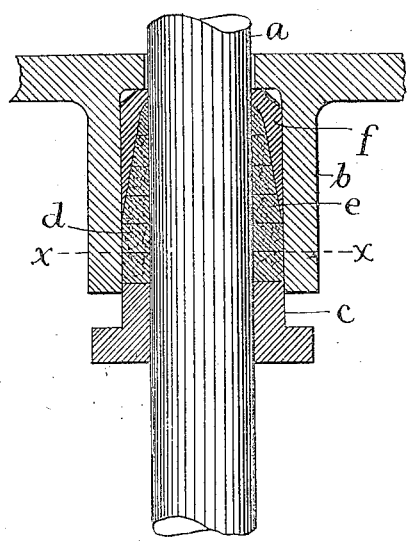
Fig. 1 is a longitudinal section through the stuffing box.
Figure 2:
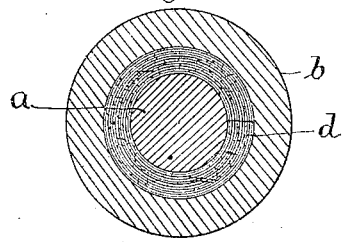
Fig. 2 is a section on the line $xx$ of Fig. 1.

In the drawing, $a$ represents the rod to be packed which may be rotating or reciprocating longitudinally $c$ is the follower which is forced inward by screws (not shown) in the usual way.

The inner surface of the cup section is so formed as to produce an inwardly tapering annular recess which tends to force the packing against the rod as the former is forced inward by the follower. As here shown, the stuffing box is bored out parallel and the tapering recess is formed by a cup-shaped bushing $f$ which is slipped into the stuffing box. The initial bevel of the bushing slopes inwardly and toward the rod commencing at a point some distance in from the end of the stuffing box and at its inner end it is rounded off so that the end of the recess makes a more obtuse angle with the surface of the rod than the general surface of the outer wall of the recess. The bushing $f$ is composed preferably of non-compressible composition metal.

As here shown, I form the packing into rings $d$ and $e$ and these rings as they are forced into the recess are molded to conform to the shape of the recess. The rings *d* are square in cross section near the outer end but as they wear and are forced inward by the follower they assume the conical form shown at *e* in Fig. 1.

The packing which I prefer to use is plastic metallic packing made up of filaments of soft metal formed into a strand and impregnated with lubricant as grease and graphite.

In carrying out this part of my invention I mix together metal particles of different alloys or compositions of different degrees of hardness, which resist the tendency to mass-amalgamation without materially affecting the property of attrition-amalgamation.

In practice I largely make use of alloys of lead, tin and antimony and obtain the different degrees of hardness by varying the proportions of these metals.

Figure 3:
Fig. 3 is a view of a portion of a strand of the soft metal packing.

In Fig. 3 is shown a strand or portion of a ring made up of metal filaments laid in substantially parallel order having suitable lubricants intermingled throughout.

A plastic metallic packing when made up as above described, namely, as a mass of filaments or particles, said filaments or particles will, under compression, have the quality of flowing or moving more or less freely over each other and as the mass is forced inward into the cup section the cross section of the packing is constantly changing, breaking up its previous formation and tending to keep the mass plastic until it is worn out at the apex of the cone. The result is practically a perpetual packing, being capable of renewal at the outer end as it is worn out at the inner end.

I claim:—

1. An outwardly opening stuffing box having a cylindrical portion parallel with the shaft, a conical portion at the inner end of said cylindrical portion terminating in a conical inner end more obtuse to the shaft than said conical portion, a follower fitting in the outer end of cylindrical portion whereby a continuous supply of packing may be passed through the stuffing box and entirely utilized.

2. An outwardly opening stuffing box having a cylindrical portion parallel with the rod or shaft, a conical portion terminating in a portion having a more obtuse bevel to the rod or shaft, a plastic packing material in the box and a follower adapted to force the packing material inward.

3. An outwardly opening stuffing box having a cylindrical portion parallel with the rod or shaft, a conical portion terminating in a portion having a more obtuse bevel to the rod or shaft and a follower adapted to force packing material toward the obtuse bevel.

In testimony whereof I have affixed my signature, in presence of two witnesses.

GEORGE B. GATES.

Witnesses:
S. W. BATES.
C. B. CREIGHTON.